Dec. 25, 1956 W. LEATHERS ET AL 2,775,139
TRAVERSE GEAR BOX
Filed Jan. 28, 1955 7 Sheets-Sheet 7

INVENTORS
WARD LEATHERS
WILFRED E. MAZUR
JAMES G. WEAVER
BY
ATTORNEY.

United States Patent Office 2,775,139
Patented Dec. 25, 1956

2,775,139

TRAVERSE GEAR BOX

Ward Leathers, Brooklyn, N. Y., and Wilfred E. Mazur, Pontiac, and James G. Weaver, Royal Oak, Mich.; said Leathers assignor to International Business Machines Corporation, New York, N. Y., a corporation of New York Application January 28, 1955, Serial No. 484,637

12 Claims. (Cl. 74—626)

This invention relates to improvements in traverse gear boxes and more particularly to improvements in gear boxes of the type shown in United States patent to Leathers et al., No. 2,475,329.

Gear boxes of the type mentioned in the above patent are subject to heavy loads, and shocks and compactness of mechanism is quite essential. Gear reductions are required and in the previous patent the reductions were effected by simple spur gearing.

One object of the present invention resides in the provision of a novel arrangement and disposition of planetary gearing to afford additional gear reduction while still retaining compactness of the structure.

A further object of the present invention resides in the provision of relatively heavy, spiral, flat springs for taking up shock and providing elimination of back lash in the chain of planetary gearing used. Such use of flat, spiral springs (clock springs) enables very strong springs to be used which are necessary to gain the desired effect. Such springs also have a very straight line characteristic which is highly desirable.

A further object of this invention resides in the provision of a combined manual and power drive mechanism for use in driving an object, e. g. a turret, in traverse on some mobile base such as a tank or a ship or an airplane. The mechanism is particularly designed for use on a tank to drive its turret in traverse. A tank is designed to operate over rough terrain and consequently is subject to very uneven and heavy shock loads on its turret traverse drive. Such heavy shock loads are commonplace in a tank for the reason that extreme speed of maneuver is the rule rather than the exception in combat maneuvering.

A very important object of the present invention is to provide a gear drive mechanism for turning a turret in traverse, which mechanism can at the same time act as a "travel lock" for the turret. Consider the action of a tank in use and it will be clear that some provision is necessary to positively lock the turret, which lock can stand the high inertia loads caused by sudden maneuvering. For example, the tank may be proceeding along with some of the personnel standing in the hull with some part of their bodies outside of the turret. Then it might be desirable to make a sudden turn—the speed of turn may be terrific if the tracks are driven in opposite direction—and if the turret were not securely locked, the personnel would be highly endangered. When a heavy gun is carried by the turret, the inertia loads under such sudden turns are enormous. Of course, travel locks have been provided which are manually operated by means of some type of screw down arrangement to lock the turret to the hull, but this involves a time consuming operation which it is an object of this invention to eliminate.

A further object of this invention lies in the provision of an effective "travel lock" mechanism which is able to withstand the very large magnitude shock and inertia loads applied due to high speed maneuvering and rough terrain. A standard "no-back" lock is used to keep the handle from rotating because of such "road loads." And in order to protect the parts involved from being snapped under the high stresses encountered, a pair of heavy, shock-absorbing springs are provided which act in cooperation with a differential mechanism to take up these shock loads. There is also a friction slip clutch provided so that in the event the loads involved should exceed the limits of the shock-absorbing springs, this clutch may slip and eliminate any breakage of parts. In all but the most extreme conditions the friction clutch will have no effect.

A further object of the present invention resides in the provision of differential gearing cooperating with heavy, flat, spiral springs disposed in the manual drive train for absorbing road loads and shocks imposed on the two trains of reducing gearing, which, through pinions, effect the traversing action.

Other objects and advantages of the invention will appear as the particular description thereof proceeds in light of the drawings forming part of this application, and in which drawings:

Fig. 2a is a sectional view taken on line 2a—2a of Fig. 2;

Figure 5:
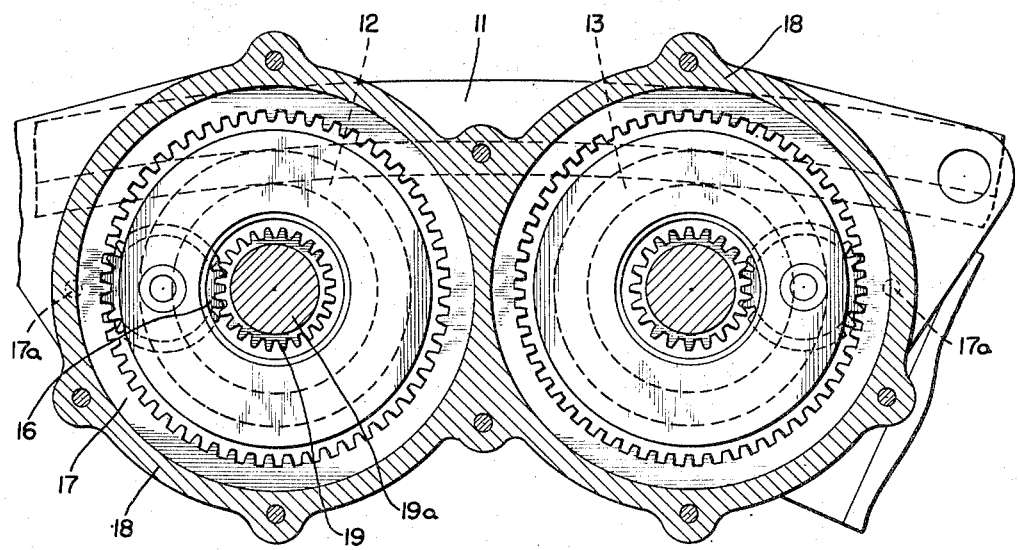
Fig. 5 is a sectional plan view taken along the line 5—5 indicated in Fig. 2.
Figure 6:
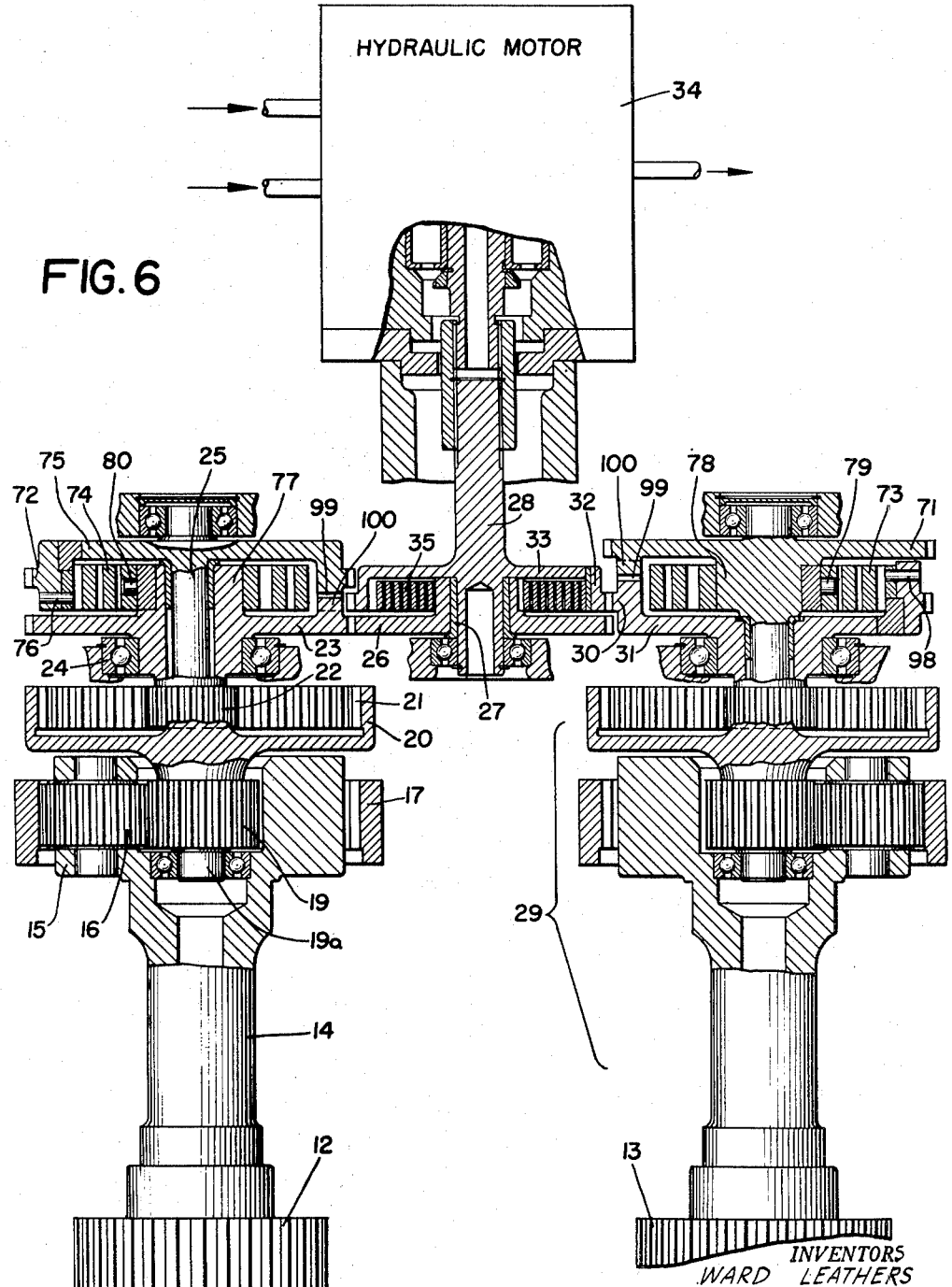
Fig. 6 is a view partially in section taken along the lines 6—6 indicated in Fig. 3, showing the motor drive.

In the specific embodiment of a gear box mechanism illustrated the housing is in general only fragmentarily shown in order to improve the clarity of description of the various elements. The drive is being effected between a turret and a hull upon which the turret is mounted for rotation. The relative rotation of the turret and hull is obtained by a pair of gears meshing with a large diameter ring gear, which may be secured to either the turret or the hull, preferably the latter. Such a ring gear is at 11 in Fig. 2, and the driving gears which mesh with this ring gear are indicated at 12 and 13. Two driving gears are used in order to eliminate back lash in the manner as is fully disclosed in the previously mentioned patent to Leathers et al. No. 2,475,329. A further reason for using two driving gears is to be able to obtain a shock absorbing road lock effect when the manual drive is coupled for operation. The reducing gear trains will first be described and reference is made to Fig. 6. Output gears 12 and 13 mesh with the ring gear 11 which is not shown in this figure, but which may be seen in Fig. 2 and in Fig. 5. Generally described, each reducing gear train comprises a planetary gear assembly which coacts with a drive shaft and which shaft also coacts with an internal gear meshing with a coacting pinion gear. Having this general arrangement, compactness is secured with substantial gear reduction. Each of the two gear trains which drive the aforesaid gears 12 and 13 are practically identical; therefore, the description will be limited to one of these reducing gear trains. Taking the left hand gear train as shown in Fig. 6, gear 12 is integral with shaft 14 which in turn carries a spider member 15 on which is journaled a planet gear 16. This gear meshes with an internal ring gear 17 which is securely staked, i. e. fastened by pins 17a (Fig. 2), to a housing 18, which housing is not shown in Fig. 6 but may be seen in Figs. 1, 2, 3, and 5. The planet pinion gear 16 also meshes with a sun gear 19, which is integrally fastened to a shaft 19a which also carries cup-shaped member 20 which has internal gear teeth 21.

Figure 4:
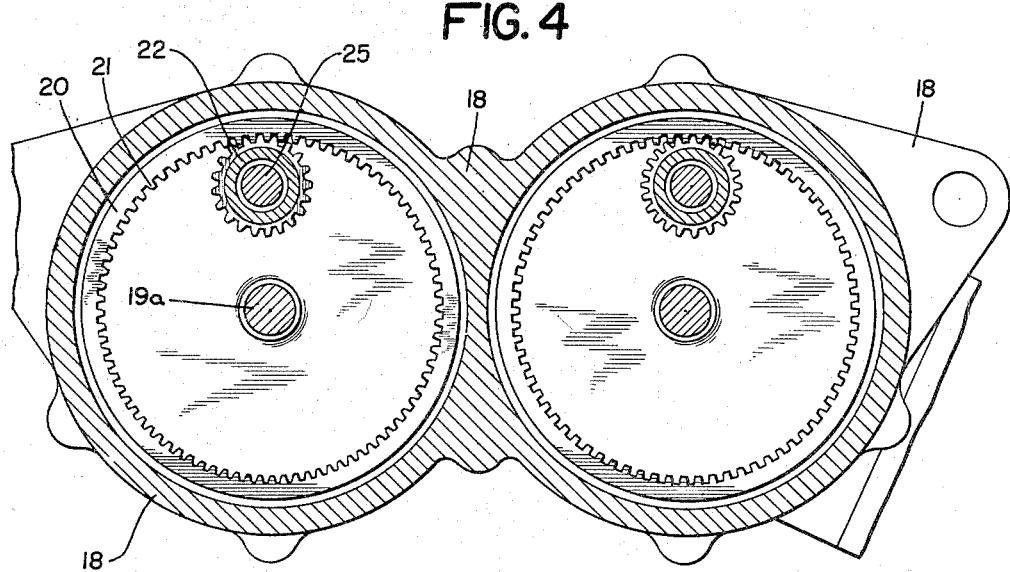
Fig. 4 is a sectional plan view of the gear box taken along the line 4—4 of Fig. 2.

To clarify the description, at this point reference is made to Fig. 5 where the relation between the housing 18, internal gear 17 and planet pinion gear 16, which also meshes with sun gear 19, will be made clear. It will be noted that Fig. 4 shows a similar view at a higher level, and this view and Fig. 6 show a pinion 22 meshing with the internal gear teeth 21 previously mentioned. This gearing affords supplemental gear reduction while maintaining compactness of structure. Pinion 22 may be termed the input gear to the reducing gear train and such pinion 22 is integral with a gear 23 which is disposed above it (see Fig. 6). These two gears 22 and 23 together are journaled in bearings 24 (Fig. 6) and rotate freely around shaft 25. Gear 23 meshes with gear 26 which is journaled on sleeve 27 and which may rotate freely (except for the spring connection) about shaft 28.

It will be clear that the corresponding planetary reduction gear train on the right hand side of Fig. 6, generally indicated by reference numeral 29, when followed up from the driving gear 13 in a manner similar to the previous description of the left hand gear train, terminates at gear 30 which is located on the outside of a cup-shaped member 31. It is to be noted at this point that this gear train, like that on the left hand side, constitutes positive reducing gearing connection between the input gear and the ouput driving pinion.

Gear 30 meshes with a gear 32 which is located on the outside of a cup-shaped member 33 which in turn is integral with a power drive shaft 28. The power to rotate shaft 28 is supplied by hydraulic motor 34. This hydraulic motor is of conventional design and the details of its construction form no part of the present invention. The hydraulic inlets and return indicated are for obtaining reversible operation in a well known manner.

One of the reasons for having two sets of gear trains will now be apparent, since by means of flat spiral spring 35 a biasing force is applied, tending to rotate one gear train relative to the other. This is accomplished by having the ends of this spring 35 securely fastened to the cup-shaped member 33 and to the hub of gear 26. The spring 35 will be wound up so as to be put under the desired tension at the time the parts are assembled. The effect of this force, since the output gears 12 and 13 mesh with a common ring gear, is to take up all slack in the various gears throughout both gear trains. The principal place where slack occurs, however, is not in the gear trains themselves but is between the driving pinions 12 and 13 and the large ring gear 11. The reason for this will be appreciated when it is realized that it is not possible to mount a heavy turret for free rotation on a mobile base, without having some radial play between the turret and its base. Such radial play necessitates that the driving pinions be mounted with their pitch line outside of the pitch line of the ring gear, i. e. the pinions are not in tight engagement with the ring gear. Mounting the driving pinions in this way allows for the radial play, and the back lash remover spring 35 takes up the differences of slack which are encountered by reason of such radial play.

In other words, when power is applied from the hydraulic motor to cause output gear 13 to rotate in one direction, the spring 35 tends to cause output gear 12 to rotate in the opposite direction so that all slack in the left hand gear train which drives gear 12 will continuously be taken up by the action of the spring 35, and gear 12 will follow along maintaining contact with the teeth of ring gear 11. When the reverse drive is effected by the hydraulic motor 34, it will drive the spring 35 and the output gear train driving gear 12 so that under normal loads gear 12 will be carrying the load through the spring 35 while in this instance gear 13 will merely be following along.

The foregoing description has set forth the manner in which power is applied from motor 34 and utilized through the reducing gear trains to drive the pinions 12 and 13 and the manner in which back lash under power drive can be taken up by the spiral flat spring 35.

Figure 2:
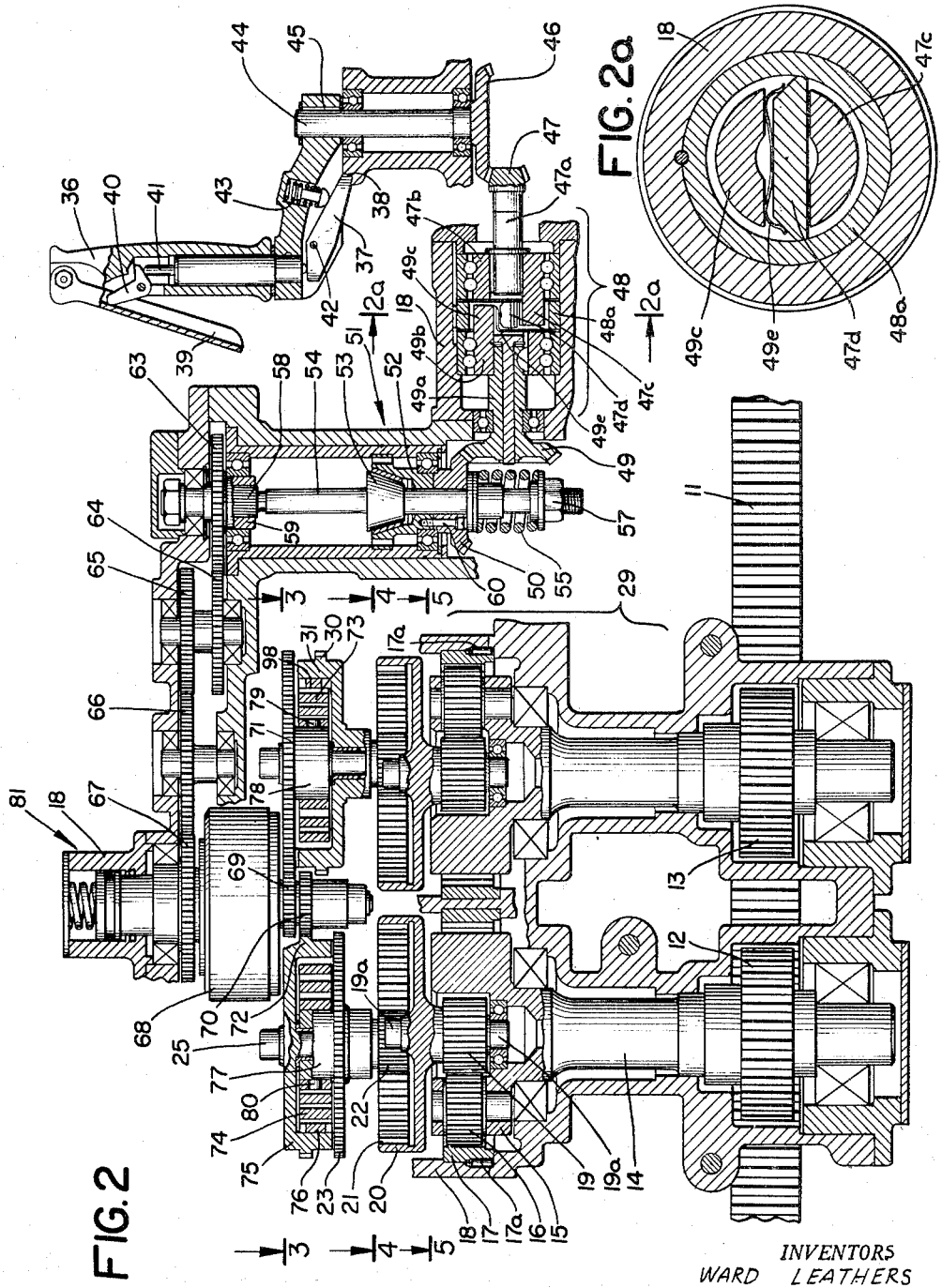
Fig. 2 is a view partly in section taken along the lines 2—2 indicated in Fig. 1.

The manual drive will be explained in reference to Fig. 2. It will be noted that the same planetary gear trains driving output gears 12 and 13 are utilized for the hand drive. The hand drive includes a handle 36 (Fig. 2). This handle when not in use is locked in position by means of a locking lever 37 which falls into a detent 38 located on the framework of the gear box. To operate the handle it will be manually gripped and in so doing grip lever 39 is depressed, which in turn, acting through lever 40 and pin 41, acts on locking lever 37 which is pivoted about a point as indicated by reference numeral 42. When the handle is gripped in this manner, locking lever 37 will be raised against the action of spring 43, and the handle will be free to rotate with its shaft 44 to which it is keyed as indicated at 45. Rotating this shaft 44 by means of the handle turns bevel gear 46, which in turn meshes with a bevel pinion 47, which is an input element of a no-back lock device generally indicated by reference numeral 48. This no-back lock device forms no part of the present invention per se but will be briefly described.

The shaft 47a carrying gear 47 is keyed to the inner race of a bearing 47b which has integral therewith a crescent-shaped extension 47c which underlies a locking dog 47d (see also Fig. 2a). Shaft 49a carrying gear 49 is keyed to the inner race of a bearing 49b which has integral with it a crescent-shaped extension 49c which overlies the top of the locking dog 47d with a compression spring 49e interposed therebetween. Annular member 48a is suitably keyed to the housing 18. The locking dog 47d is eccentrically disposed in the annular member 48a (see Fig. 2a). With this arrangement, if extension 47c is rocked in either direction the locking dog 47d will be released from locking engagement with the annular member 48a and driving force will be imparted through the locking dog 47d to the crescent-shaped member 49c and finally to the shaft 49a. On the other hand, if force is applied from 49a tending to rock crescent 49c in either direction, the locking dog 47d will be crammed into engagement with the annular member 48a and no turning force will be applied to shaft 47a.

The operation of such a no-back lock is such that power may be applied from the manual input side to cause rotation of the device, while if rotation is initiated from the other end, the device will lock to the casing 18 and no rotation will be possible. Therefore, if road loads are imposed on the gear train, e. g. sudden turns are made or rough terrain is traveled over or a combination of both, no tendency to rotate will be felt at the manual drive side of the no-back device. One reason for such a mechanism is evident when it is considered that in using the present gear box system in a tank, where space is at a premium, it would be quite dangerous to have a manual handle which might be rotated by movements of the heavy turret mechanism at any time. Another reason for incorporating the no-back device is to gain an effective road lock of the turret while at the same time allow manual positioning of the turret at any time with no danger to the operator of the manual handle. The handle 36 can be turned in either direction to impart rotation to gear 49 through the no-back lock 48. However, if turning force is applied to the gear 49 itself from the left, the no-back lock positively locks to the casing and prevents rotation of the handle. Accordingly a friction clutch must be interposed in the driving connection from the no-back lock to the reducing gear trains. This friction should be adjusted with just enough tension to slip if the loads applied back from the road, e. g. inertia loads on the turret, are greater than the shock absorbing springs and spring barrel assemblies (73, 74 and related parts) can absorb.

To continue following the manual drive, gear 49, which is on the turret gear side of the no-back clutch mechanism 48, meshes with a corresponding bevel gear 50 located on a friction clutch, generally indicated by reference numeral 51. Gear 50 and a female clutch element 52 are securely fastened together by a bolt 60. The female clutch element 52 cooperates with a conical shaped section 53 of shaft 54; these two are spring-pressed into engagement. The spring which provides spring pressure is indicated by reference numeral 55, and may be compressed by adjusting nut 57. The spring tension on this friction clutch may therefore be adjusted by this nut. There is a splined section 58 at the top of shaft 54 which fits into an internal splined section of gear 63. Suitable bearings journal shaft 54 and related parts in the housing 18. The adjustment effected by nut 57 determines the amount of spring pressure causing frictional engagement between conical-shaped member 53 and female clutch element 52, which are the friction clutch surfaces themselves.

To continue following the mechanism, which now has the dual function of acting as a road lock and as means for manually repositioning the turret, it will be noted that gear 63 is integral with collar or hub 59, and therefore is rotated by means of the rotation of shaft 54. Gear 63 meshes in turn with lower gear 64 of the pair of idler gears, the gear of which pair is indicated by reference numeral 65. Gear 65 meshes with a further idler gear 66, which in turn meshes with gear 67. This gear 67 is integral with a differential casing 68, containing differential gearing which will be more fully described in detail hereafter. Output of the differential in casing 68 is through gears 69 and 70, which are located below the bottom of the differential casing. These gears 69 and 70 mesh in turn with gears 71 and 72, respectively, which in turn are connected into the planetary gear trains by means of flat, spiral springs 73 and 74 (see also Fig. 3). It will be noted that gear 72 is on the outside of cup-shaped member 75 to which is securely fastened or staked one end of spring 74 by means of a rivet or pin as indicated by reference numeral 76. The other end of spring 74 is securely fastened or staked to the hub 77 by means of a pin 80, which hub is integral with gear 23. These connections are also clearly illustrated in Fig. 6. On the right hand side spring 73 is securely fastened to the hub 78 integral with gear 71, such fastening being indicated at reference numeral 79. The other end of spring 73 is securely fastened to cup-shaped member 31 by means of pin 98. The cup-shaped member 31 in turn carries gear 30, being one of the input gears from the hydraulic motor drive.

When hydraulic pressure is available and applied to the hydraulic motor 34 (Fig. 6) provision is made to disengage the road lock and hand drive. For this purpose there is a hydraulically operated clutch generally indicated by reference numeral 81 (Fig. 7), which is located above the differential casing 68. This clutch operates by means of hydraulic fluid introduced into a space 82 via a pipe 92 which causes a sleeve 83 to be raised vertically against the pressure of spring 84. When the sleeve 83 is raised, it lifts a shaft 85 and its bearing 86 which is embraced by washers 87, one of which coacts with the sleeve. Integral with shaft 85 is a central gear 88 which meshes with the idler gears of the differential. Upon operation of the clutch, gear 88 is raised vertically out of engagement with these idler gears of the differential. It may be seen that there is a space indicated by reference numeral 89 into which gear 88 will be carried upon raising of the shaft and gear by means of the hydraulically operated clutch. It may be noted that output gear 70 which is located near the lower extremity of the shaft 85 and which is keyed to the shaft has a provision for the vertical movement of shaft 85, afforded by a long keyway 90 on the shaft 85 allowing vertical motion to take place while maintaining positive keyed connection between the shaft 85 and gear 70. The differential casing 68 is mounted to freely rotate in its bearings 91 shown. These bearings are mounted in part of the housing indicated at 18 in Fig. 7. It will be appreciated that upon operation of the hydraulic clutch 81, since gear 88 is withdrawn, no positive connection remains between the differential casing 68 and the output gears 70 and 69.

Figure 7:
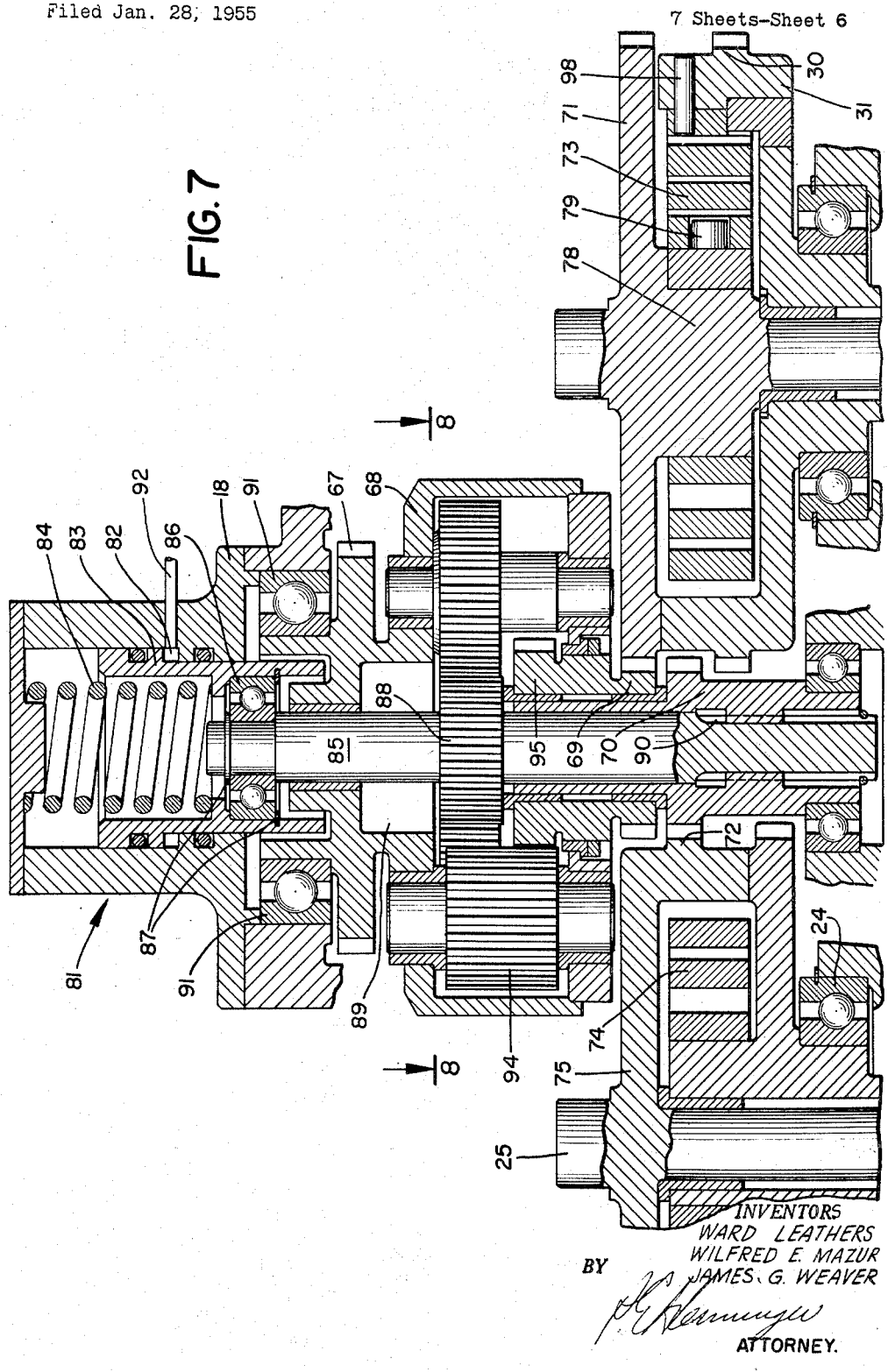
Fig. 7 is an enlarged partial sectional view of the differential and hydraulically operated clutch taken along the lines 7—7 of Fig. 8.
Figure 8:
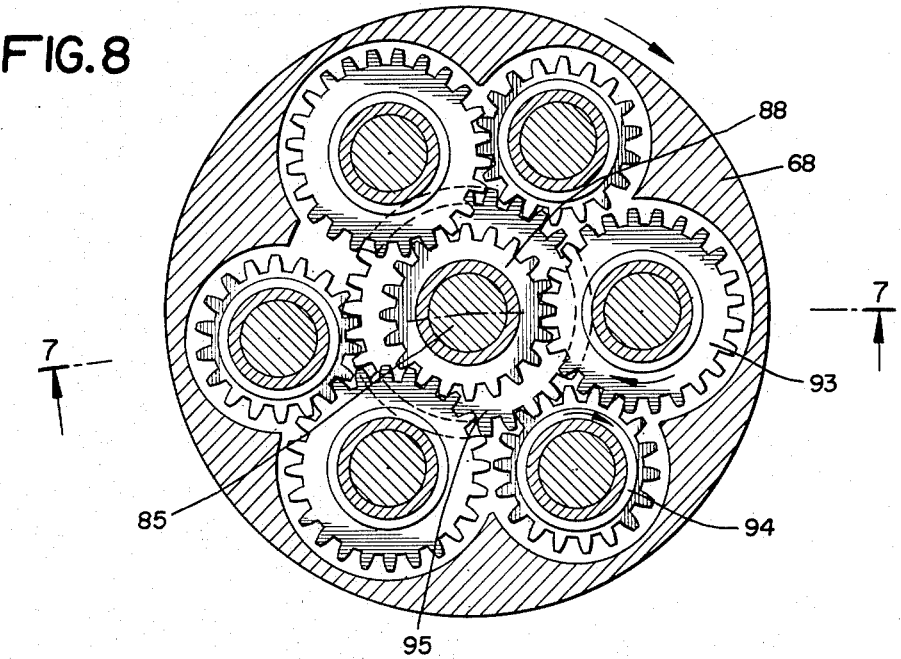
Fig. 8 is a sectional plan view taken along the line 8—8 of Fig. 7.

In order to more fully explain the operation of the differential, attention is directed to Fig. 8 where the drive to the output gears will be fully explained. The differential casing 68 is rotatably driven by means of its gear 67 (see Fig. 7) from the hand drive and carries with it three pairs of idler gears, one pair of which is indicated by reference numerals 93 and 94. At this point it is pointed out that output gears 70 and 69 (see Fig. 7) are positively connected to shaft 85 and gear 95, respectively. Assuming differential casing 68 is rotated clockwise, as viewed from above (and as indicated by the arrow shown in Fig. 8), gear 93 will tend to walk around gear 88 with which it meshes. This would produce clockwise rotation of gear 93 (see the arrow). However, gear 94 would tend to walk around lower gear 95, which is integral with output gear 69 (shown in Fig. 7). This also would cause clockwise rotation of gear 94 (see the arrow). However, since gears 93 and 94 mesh with one another, clockwise rotation by each would be in opposition. Therefore, the gears are locked together and output gears 70 and 69 tend to rotate in unison. Any difference in load on the two output gears 70 and 69 would, however, cause rotation of gears 93 and 94 which would equalize such difference in load in a well known manner for differential gearing. It is noted that this explanation covers only one pair of the three pairs of idler gears shown in the whole differential. The action of each of the other two pairs is identical and the other gears serve to distribute the load equally around the centrally located output gears.

The enlarged detail of Fig. 7 shows clearly the connection of the output of the differential to the spring coupling members which are the means by which road block action is secured. Hand drive is also introduced via the differential since it comes through the no-back lock.

With the differential arrangement described, road loads and inertia loads which tend to drive back through the gear trains to the no-back lock are absorbed by the shock absorbing spring barrels carrying springs 73 and 74.

Figure 1:
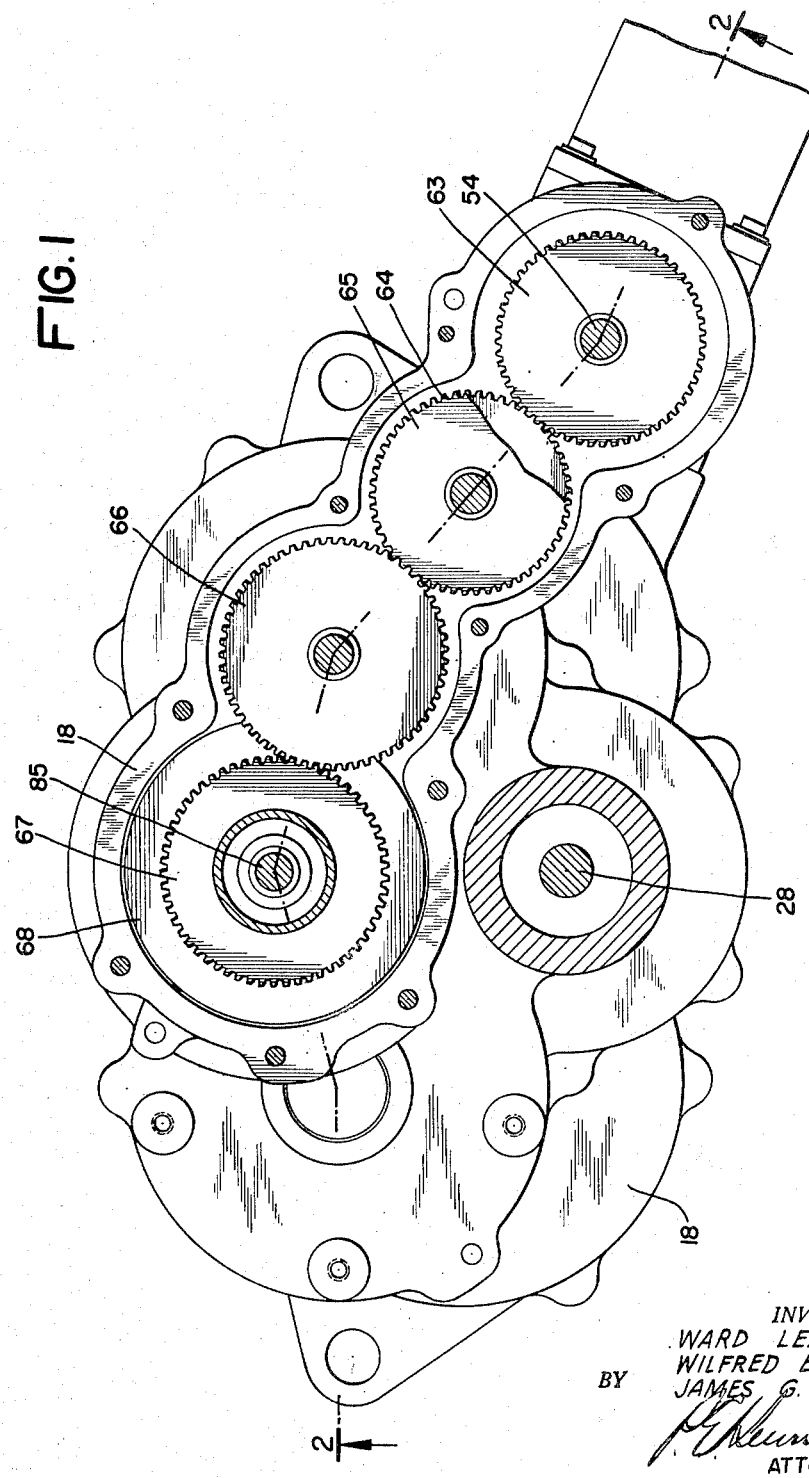
Fig. 1 is a plan view of the gear box with one cover of the housing removed, not including the no-back lock and the manual handle.
Figure 3:
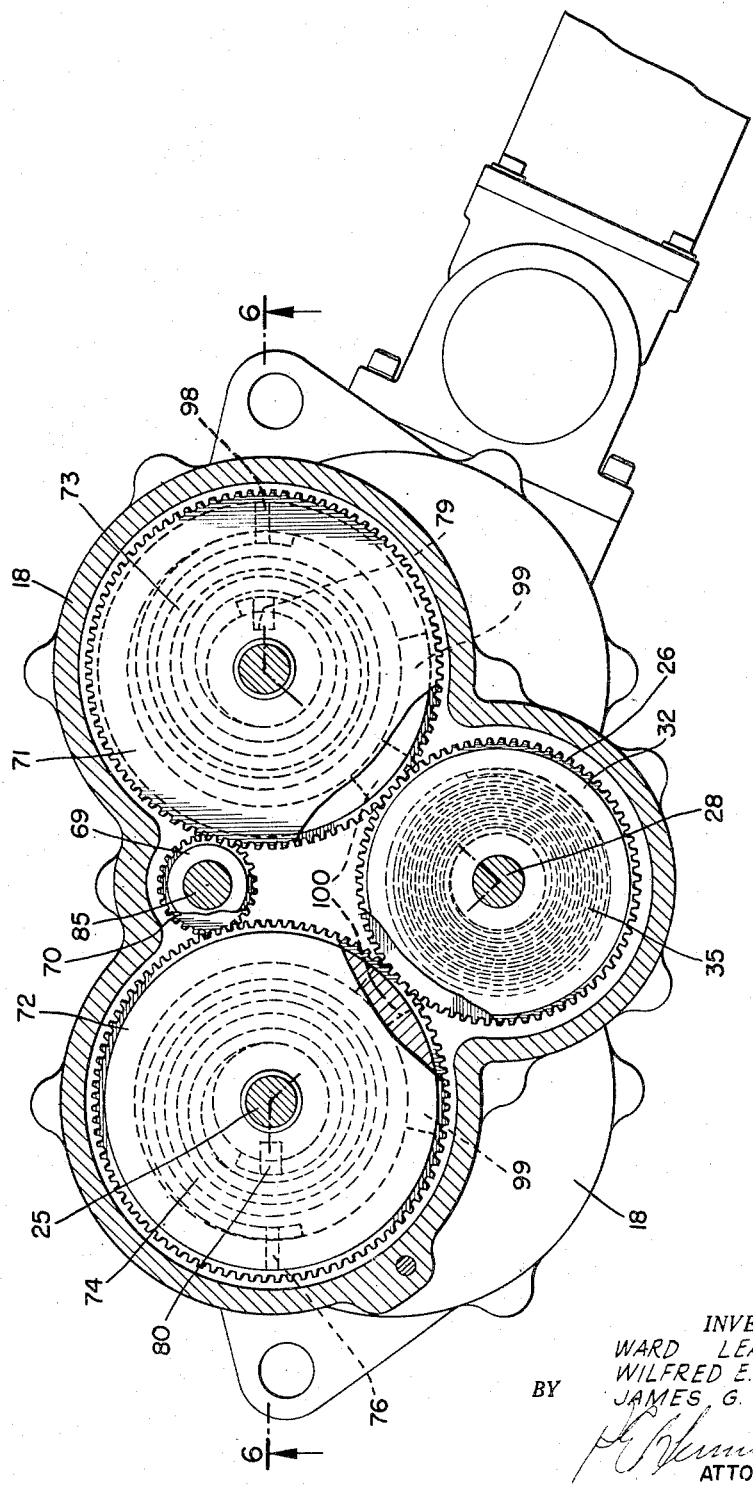
Fig. 3 is a sectional plan view of the gear box taken at the line 3—3 indicated in Fig. 2.

To clarify the relationship between manual drive and motor drive, reference is made to Figs. 1 and 3 where it is noted that output gears 32 and 26 of the motor are shown with the preloaded spring 35 in Fig. 3, while output gears 70 and 69 of the manual drive are the small gears at the top of the figure. It will be appreciated that manual drive is effected through the no-back lock and via the differential, while motor drive is effected by means of direct gear coupling via one gear train and through anti-back-lash spring 35 to the other gear train.

Figure 9:
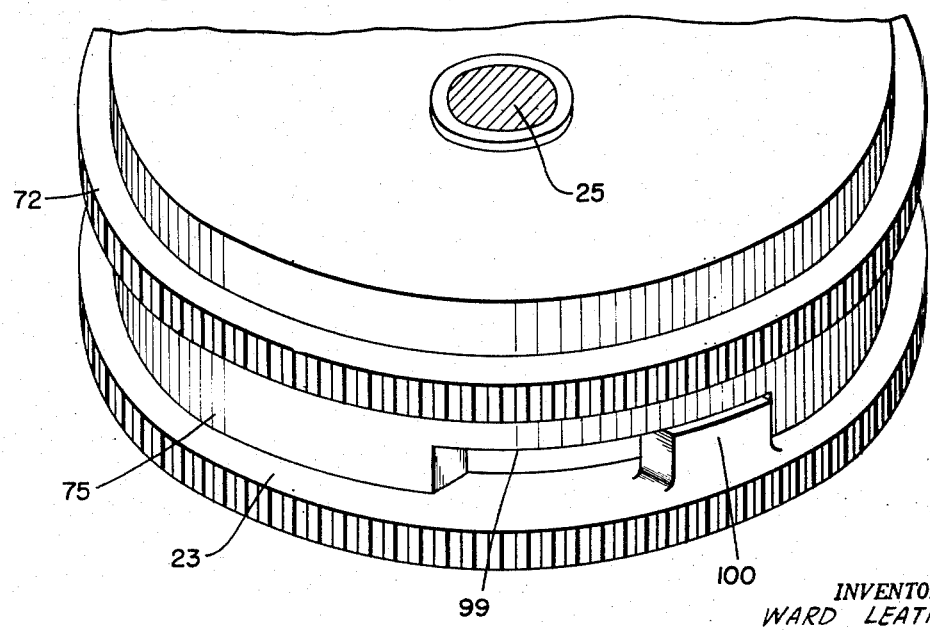
Fig. 9 is a fragmentary perspective view of the left hand spring barrel assembly, showing a detail of the positive stop motion.

In order to accomplish a prestressed condition of shock absorber springs 73 and 74, because of the differential coupling which is employed, a positive stop, motion limiting means must be employed. This is illustrated clearly in Fig. 9. The same means appears in Figs. 3 and 5. It will be clear that there is a notch 99 in each cup-shaped member 31 and 75, which is the desired size, i. e. in the degrees of arc, which is notched out. A lug 100 is located on gear 23 and on gear 71 and cooperates with the notch 99 to limit the amount of free relative motion which may exist between cup-shaped members 75, 31 and gears 23, 71, respectively. The springs 74 and 73, being wound up, will hold the lug 100 against one end of the notch 99 in each case. By referring to Fig. 3 it will be seen that these springs 73 and 74 are wound in opposite directions. The effect thus gained is to have a positive direct coupled drive in either direction of turning of the manual drive since the shock absorber springs (73 and 74) are very heavy, while at the same time heavy road loads or inertia shocks may be absorbed by these springs in cooperation with the differential.

The clutch 81 (Figs. 2 and 7) operates in connection with motor drive so that when hydraulic pressure is applied to turn the motor in either direction, the manual drive and road lock will be declutched. This provides an automatic means for having the turret in road lock condition and for having the manual drive clutched in, ready for use whenever hydraulic pressure failure should occur which would incapacitate the motor drive.

In many of the illustrations, bearings for various rotating parts have been shown only schematically by means of an X to indicate their location. It will be understood that the housing and various details have been omitted in some views, or entirely, for the sake of clarity and that such elements may take various forms and not alter the gist of the invention.

Attention is again directed to the function of the pair of heavy flat spiral springs which act in cooperation with the differential mechanism to absorb the very high magnitude shock loads encountered while maneuvering and so save the no-back lock and related parts from breaking stresses.

While there has been disclosed in some detail a specific embodiment of the invention in accordance with the applicable statutes, this is not to be taken as in any way limiting the invention, but merely as being descriptive thereof.

It is claimed:

1. A continuous acting locking mechanism for preventing undesired turning of a turret member or the like relative to a mobile support member upon which it is mounted comprising a ring gear mounted on one of said members, a pair of heavy duty gears engaging said ring gear and mounted on the other of said members, a differential for completing a connection between said pair of heavy duty gears and a single rotatable shaft, shock absorbing spring means located between said differential and each of said pair of heavy duty gears, and no-back lock means for preventing rotation of said single shaft being initiated by said pair of heavy duty gears.

2. A continuous acting locking mechanism for preventing undesired turning of a turret member or the like relative to a mobile support member upon which it is mounted comprising a ring gear mounted on one of said members, a pair of heavy duty gears engaging said ring gear and mounted on the other of said members, a pair of reducing gear trains joining said pair of gears to a differential means, heavy duty shock absorbing spring means located in each of said reducing gear trains, a single rotatable shaft connected to said differential means, no-back lock means for preventing rotation of said rotatable shaft, and friction clutch means interposed between said single rotatable shaft and said no-back lock means for allowing rotation of said shaft upon overload beyond the ability of said shock absorbing spring means to handle.

3. A continuous acting locking mechanism for preventing undesired turning of a turret member or the like relative to a mobile support member while at the same time enabling desired turning to be effected manually comprising a ring gear mounted on one of said members, pair of heavy duty gears mounted on the other of said members, a pair of reducing gear trains joining said pair of gears to a differential means, heavy duty shock absorbing spring means located in each of said reducing gear trains, a single rotatable shaft connected to said differential means, no-back lock means having two inputs for allowing rotation to be effected by one input while preventing rotation by the other input, friction clutch means connecting said shaft to said rotation preventing input, and manual means connected to said rotation allowing input for effecting manual turning of said turret.

4. In a heavy duty drive mechanism for rotatably driving a turret or the like relative to a body upon which said turret is mounted the combination including a ring gear mounted on one of said members, a driving gear mounted on the other of said members, a second driving gear also mounted on the other of said members, two planetary gear trains connecting said driving gears to a source of power, flat spiral spring means for biasing one train for rotation relative to the other in order to eliminate back lash, and manual power means including spring coupling means coupled through said gear trains for shock free manual control of said drive mechanism.

5. In a heavy duty drive mechanism for rotatably driving a turret or the like relative to a body upon which said turret is mounted the combination including a ring gear mounted on one of said members, a driving gear mounted on the other of said members, a second driving gear also mounted on the other of said members, two planetary gear trains connecting said driving gears to a source of power, flat spiral spring means for biasing one train for rotation relative to the other in order to eliminate back lash, and manual power means including spring coupling means and a differential gear connection for providing shock free manual control of said drive mechanism.

6. In a heavy duty drive mechanism for rotatably driving a turret or the like relative to a hull upon which said turret is mounted the combination including a ring gear mounted on one of said members, a driving gear mounted on the other of said members, a second driving gear also mounted on the other of said members, two planetary gear trains connecting said driving gears to a source of power, flat spiral spring means for biasing one train for rotation relative to the other in order to eliminate back lash, and a shock absorbing manual power input comprising spring coupling means for absorbing any shocks, differential gear means for making said spring coupling means effective, friction clutch means for allowing slippage upon overload, means for manually applying power into said gear trains, and no-back means for producing a driving connection only when power is being applied from said manual means into said gear trains and not when reverse power is applied from said gear trains.

7. Traverse gearing for producing drive to a pair of pinions meshed with a ring gear and for providing optional manual or power driving from a manual actuating means or from a power driving means, said gearing including a pair of spring barrel assemblies, each assembly including a flat spiral shock absorbing spring, each assembly further including a gear for receiving power from a source of power drive and a gear for receiving power from driving means to a source of manual drive, an element of each of said spring barrel assemblies carrying a pinion, an internal gear driven by said pinion, a sun gear driving in unison with said internal gear, a planetary gear meshing with said sun gear and carried on a spider fixed to a shaft which drives the ring gear driving pinion, and a fixed internal gear also meshing with said planetary gear.

8. The invention according to claim 7 wherein the motor power driving means includes a third spring barrel assembly including a pair of elements connected by an anti-back lash flat spiral spring, one of said third spring barrel elements including a gear for driving one of said pair of spring barrel assemblies, and the other of said third spring barrel elements including a gear for driving the other of said pair of spring barrel assemblies.

9. The invention according to claim 7 wherein the manual actuating means includes a differential gear assembly with an input gear securing its drive through reduction from a manually actuated input drive, said differential gear assembly having output gears respectively driving elements of each of the spring barrel assemblies.

10. Traverse gearing for affording drive to a pair of pinion driving shafts with pinions thereon for engaging a fixed ring gear, said gearing including means to couple the gearing to a power drive and means to couple the gearing to a hand drive, said coupling for power drive including a spring barrel assembly having a pair of elements coupled by an anti-back lash spring, said spring assembly also providing for anti-back lash effects when under hand drive, said coupling means for hand drive including a differential gear assembly, a driving train intermediate each pinion drive shaft and the coupling means for power drive and the coupling means for hand drive, said driving train including compound gearing having planetary gearing therein, spring barrel means for driving said compound gearing, said spring barrel means including gear elements which receive power drive and gear elements which receive hand drive through the aforesaid differential gearing.

11. Traverse gearing mechanism for driving a member which may be a turret or the like, in azimuth, relative to another member on which said turret is carried comprising a ring gear fixed to one of said members, a pair of driving pinions meshing with said ring gear and carried by the other of said members, each of said pinions being driven by a shaft having spider means integral therewith, a pair of planetary gears carried by said spider means and meshing with a pair of sun gears, a pair of internal gears fixed to the other of said members and meshing with said planetary gears, said pair of sun gears being driven by gear reduction means, manual means for driving said gear reduction means and motor means for driving said gear reduction means, said manual means including flat spiral spring means and differential means for producing shock free manual drive, said motor means including a spring barrel assembly having a flat spiral spring means for biasing one driving pinion for rotation relative to the other.

12. In a heavy duty mechanism for rotatably driving a turret or the like relative to a body upon which said turret is mounted, by means of motor power and of manual power, the combination including a ring gear mounted on one of said members, a driving gear mounted on the other of said members, a second driving gear also mounted on the other of said members, two compact planetary gear trains connecting said driving gears to said sources of power, flat spiral spring means connecting said motor power to one of said gear trains and gear means connecting said motor power to the other of said gear trains whereby back lash in said gear trains is substantially eliminated, means for connecting said manual power to said gear trains including a pair of flat spiral spring means connected to said gear trains, differential gear means driven by said manual power and connected to said pair of spiral spring means, and a clutch operated when motor power is being applied to disconnect said manual power.

References Cited in the file of this patent

UNITED STATES PATENTS 2,437,646     Matutartis et al.          Mar. 9, 1948